(12) United States Patent
Knox et al.

(10) Patent No.: US 11,403,718 B1
(45) Date of Patent: Aug. 2, 2022

(54) SYSTEMS AND METHODS FOR SENSITIVE DATA MODELING

(71) Applicant: Meta Platforms, Inc., Menlo Park, CA (US)

(72) Inventors: Andrew Knox, Brooklyn, NY (US); Cameron Jones, Oakland, CA (US); Sanjay Kanaka Sai Tirupattur Saravanan, Fremont, CA (US); Toby Jonas F. Roessingh, Santa Cruz, CA (US); Gad Alon, Saratoga, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 338 days.

(21) Appl. No.: 16/255,800

(22) Filed: Jan. 23, 2019

(51) Int. Cl.
*G06Q 30/00* (2012.01)
*G06Q 50/00* (2012.01)
*G06Q 30/02* (2012.01)
*G06F 21/62* (2013.01)

(52) U.S. Cl.
CPC ......... *G06Q 50/01* (2013.01); *G06F 21/6245* (2013.01); *G06Q 30/0269* (2013.01)

(58) Field of Classification Search
None
See application file for complete search history.

(56) References Cited

U.S. PATENT DOCUMENTS

| 7,860,811 | B2 * | 12/2010 | Flinn | G06N 3/004 706/11 |
| 8,103,691 | B2 * | 1/2012 | Chunilal | H04L 67/10 707/661 |
| 8,380,579 | B2 * | 2/2013 | Flinn | G06Q 40/04 705/26.1 |
| 8,515,901 | B2 * | 8/2013 | Flinn | H04L 67/306 707/603 |

(Continued)

FOREIGN PATENT DOCUMENTS

| CN | 104331816 A | * | 2/2015 | G06Q 30/02 |
| JP | 2018181326 A | * | 11/2018 | G06Q 30/06 |
| WO | WO-0105136 A1 | * | 1/2001 | H04M 1/247 |

OTHER PUBLICATIONS

Stephen L. Francea et al. Marketing Analytics: Methods, Practice, Implementation, and Links to Other Fields. (Nov. 17, 2018). Retrieved online Feb. 20, 2021. https://arxiv.org/pdf/1801.09185.pdf (Year: 2018).*

(Continued)

*Primary Examiner* — James A Reagan
(74) *Attorney, Agent, or Firm* — Sheppard Mullin Richter & Hampton LLP

(57) ABSTRACT

Systems, methods, and non-transitory computer-readable media can generate individual feature data for each user of a plurality of users. A first cohort comprising a first plurality of users is generated, wherein the first plurality of users are selected from the plurality of users based on the individual feature data. A first set of cohort feature data associated with (Continued)

the first cohort is generated based on individual feature data for the first plurality of users. The first set of cohort feature data and a first set of cohort membership information are transmitted to a modeler. The first set of cohort membership information identifies each user of the plurality of users.

20 Claims, 7 Drawing Sheets

(56) References Cited

U.S. PATENT DOCUMENTS

| | | | | |
|---|---|---|---|---|
| 8,843,433 | B2* | 9/2014 | Flinn | G06N 5/048 706/52 |
| 9,171,263 | B2* | 10/2015 | Flinn | G06F 16/9535 |
| 9,454,730 | B2* | 9/2016 | Flinn | H04L 51/16 |
| 9,665,722 | B2* | 5/2017 | Nagasundaram | G06F 21/6254 |
| 10,043,035 | B2* | 8/2018 | LaFever | H04L 9/065 |
| 10,129,211 | B2* | 11/2018 | Heath | G06Q 10/10 |
| 10,699,202 | B2* | 6/2020 | Flinn | G06F 16/9535 |
| 10,904,261 | B2* | 1/2021 | Atanda | H04L 63/08 |
| 2006/0155681 | A1* | 7/2006 | Chiang | G06F 16/22 |
| 2008/0177603 | A1* | 7/2008 | Muthugopalakrishnan | G06Q 30/0225 705/14.26 |
| 2008/0243817 | A1* | 10/2008 | Chan | G06Q 30/02 707/999.005 |
| 2009/0248599 | A1* | 10/2009 | Hueter | G06N 20/00 706/15 |
| 2009/0254971 | A1* | 10/2009 | Herz | G06Q 30/0603 726/1 |
| 2010/0228582 | A1* | 9/2010 | King | G06Q 30/02 705/14.66 |
| 2010/0235313 | A1* | 9/2010 | Rea | G06F 16/9535 706/54 |
| 2011/0055017 | A1* | 3/2011 | Solomon | G06Q 30/0269 705/14.66 |
| 2011/0066497 | A1* | 3/2011 | Gopinath | G06Q 30/02 705/14.53 |
| 2011/0082825 | A1* | 4/2011 | Sathish | G06Q 10/1053 707/769 |
| 2011/0125700 | A1* | 5/2011 | Funada | G06F 11/3447 706/50 |
| 2011/0153414 | A1* | 6/2011 | Elvekrog | H04L 67/306 709/204 |
| 2011/0196776 | A1* | 8/2011 | Rash | G06Q 40/04 705/37 |
| 2011/0219011 | A1* | 9/2011 | Carmel | G06F 16/00 707/E17.143 |
| 2011/0258049 | A1* | 10/2011 | Ramer | G06Q 30/0273 705/14.66 |
| 2012/0209710 | A1* | 8/2012 | Ramer | G06Q 30/0273 705/14.51 |
| 2012/0254099 | A1* | 10/2012 | Flinn | G06F 40/253 706/52 |
| 2012/0290518 | A1* | 11/2012 | Flinn | G06Q 50/01 706/12 |
| 2013/0191223 | A1* | 7/2013 | Harris | G06Q 30/0269 705/14.66 |
| 2013/0268357 | A1* | 10/2013 | Heath | G06Q 30/02 705/14.53 |
| 2014/0047551 | A1* | 2/2014 | Nagasundaram | G06F 21/606 726/26 |
| 2014/0316811 | A1* | 10/2014 | Ohnemus | G16H 50/30 705/3 |
| 2014/0358842 | A1* | 12/2014 | Flinn | G06N 5/048 706/52 |
| 2015/0095278 | A1* | 4/2015 | Flinn | G06N 7/005 706/55 |
| 2016/0012344 | A1* | 1/2016 | Flinn | G06F 16/9535 706/52 |
| 2016/0171540 | A1* | 6/2016 | Mangipudi | G06Q 30/0255 705/14.53 |
| 2016/0364651 | A1* | 12/2016 | Flinn | H04L 51/16 |
| 2018/0019984 | A1* | 1/2018 | Isaacson | G06Q 50/01 |
| 2019/0109914 | A1* | 4/2019 | Miller | H04W 4/21 |
| 2019/0306137 | A1* | 10/2019 | Isaacson | G06Q 30/0635 |
| 2020/0074335 | A1* | 3/2020 | Flinn | G06F 16/24575 |

OTHER PUBLICATIONS

Jiawei Yuana et al. Towards a privacy preserving cohort discovery framework for clinical research networks. (Feb. 2017). Retrieved online Sep. 2, 2021. https://www.sciencedirect.com/science/article/pii/S1532046416301824 (Year: 2017).*

* cited by examiner

SYSTEMS AND METHODS FOR SENSITIVE DATA MODELING

FIELD OF THE INVENTION

The present technology relates to the field of digital data modeling. More particularly, the present technology relates to techniques for computerized modeling of sensitive digital data.

BACKGROUND

Today, people often utilize computing devices (or systems) for a wide variety of purposes. Users can use their computing devices to, for example, interact with one another, access content, share content, and create content. In some cases, content items can include postings from members of a social networking system. The postings may include text and media content items, such as images, videos, and audio. In certain instances, postings can also include advertisements for products or services. The postings may be published to the social networking system for consumption by others.

SUMMARY

Various embodiments of the present technology can include systems, methods, and non-transitory computer readable media configured to generate individual feature data for each user of a plurality of users. A first cohort comprising a first plurality of users is generated, wherein the first plurality of users are selected from the plurality of users based on the individual feature data. A first set of cohort feature data associated with the first cohort is generated based on individual feature data for the first plurality of users. The first set of cohort feature data and a first set of cohort membership information are transmitted to a modeler. The first set of cohort membership information identifies each user of the plurality of users.

In an embodiment, the first set of cohort feature data is one of a plurality of sets of cohort feature data transmitted to the modeler.

In an embodiment, the plurality of sets of cohort feature data are transmitted to the modeler by a plurality of sensitive data controllers.

In an embodiment, each set of cohort feature data of the plurality of sets of cohort feature data is associated with a respective cohort of a plurality of cohorts, and each sensitive data controller generates one or more cohorts of the plurality of cohorts independently of the other sensitive data controllers.

In an embodiment, each sensitive data controller of the plurality of sensitive data controllers has access to a unique set of sensitive data pertaining to one or more users.

In an embodiment, the first plurality of users are selected from the plurality of users such that the first cohort is diverse with respect to at least one feature represented in the individual feature data.

In an embodiment, the first set of cohort feature data allows the modeler to make probabilistic determinations about each user of the first plurality of users.

In an embodiment, the individual feature data pertains to one or more advertisements.

In an embodiment, the individual feature data for each user indicates whether the user was presented with a particular advertisement.

In an embodiment, the individual feature data pertains to one or more products or services associated with the one or more advertisements.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
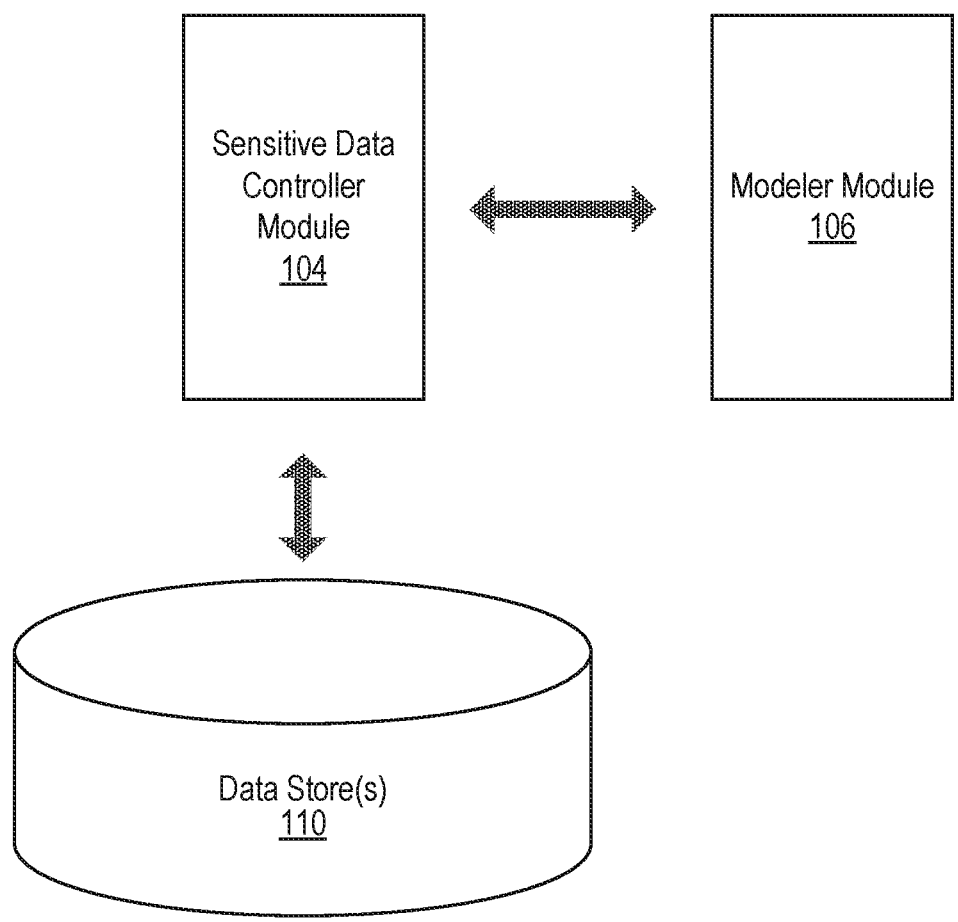
FIG. 1 illustrates an example sensitive data modeling system, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Modeling Using Sensitive Data

People often utilize computing devices (or systems) for a wide variety of purposes. Users can use their computing devices to, for example, interact with one another, access content, share content, and create content. In some cases, content items can include postings from members of a social networking system. The postings may include text and media content items, such as images, videos, and audio. In certain instances, postings can also include advertisements for products or services. The postings may be published to the social networking system for consumption by others.

Content generators may post content on content publishing platforms, such as a social networking system. In certain instances, content generators may expend considerable time and resources to publish content on a content publishing platform. For example, an advertiser may expend time and resources to create an advertisement, and then may pay a fee for a social networking system to share the advertisement to users of the social networking system. Given the time and resources expended to create and disseminate these advertisements, an advertiser may have some interest in being able to determine whether the advertisements yielded any beneficial results. For example, a manufacturer of a product that publishes advertisements of the product on a social networking system may have an interest in being able to determine whether the advertisements resulted in increased sales of the product. Similarly, a content publishing platform, such as a social networking system, may have an interest in demonstrating to content generators (e.g., advertisers) that publishing content on the content publishing platform has a positive effect for the content generators (e.g., increased sales).

However, under conventional approaches, demonstrating the effects of advertisements or published content may be difficult due to various user data privacy considerations. Consider an example scenario in which Brand A publishes an advertisement for Product A on a social networking system. The social networking system may present the advertisement for Product A to a user, User A. In an ideal scenario for Brand A, User A is presented with the advertisement for Product A and, in response to viewing the advertisement, visits a third-party online retailer to purchase Product A. It would be beneficial for Brand A to know whether its advertisement on the social networking system resulted in a sale, and the social networking system would also benefit from Brand A knowing that advertising on the social networking system yielded positive results. However, in order to protect User A's privacy interests, the social networking system may not be inclined to share with Brand A or the third-party online retailer that User A specifically was presented with the advertisement for Product A. Similarly, the third-party online retailer may be aware that User A purchased Product A but, in order to protect User A's privacy interests, may not be inclined to share with Brand A or the social networking system that User A purchased Product A. Sensitive data controllers that maintain sensitive data about individuals, such as the social networking system and the third-party online retailer in the example above, have an interest in protecting the individual privacy of users utilizing their services.

Certain conventional approaches have attempted to address this problem by utilizing a third-party modeler to act as neutral, uninterested party that can receive sensitive data about individuals from various sensitive data controllers so that the third-party modeler can model and determine the effects of advertisements on purchasing decisions. For instance, in the example above, Brand A may report to the modeler the amount of money it spent presenting the advertisement for Product A at various publishing platforms (including the social networking system), the social networking system may report to the modeler the specific individuals that were presented with the advertisement for Product A (including User A), and the third-party retailer may report to the modeler all individuals that purchased Product A (including User A). In this way, none of the interested parties (e.g., Brand A, the social networking system, and the third-party retailer) has a full picture of User A's advertising or purchasing history, but the modeler has sufficient information to be able to draw conclusions that are useful for Brand A. However, such approaches still require that sensitive data controllers, such as the social networking system and the online retailer, share sensitive individual user information with the modeler. As such, under conventional approaches, it is a challenge to measure the effects of advertisements or other published content while also protecting user data privacy interests. Conventional approaches may not be effective in addressing these and other problems arising in computer technology.

An improved approach rooted in computer technology overcomes the foregoing and other disadvantages associated with conventional approaches specifically arising in the realm of computer technology. In general, rather than having sensitive data controllers provide a modeler with sensitive data about specific individuals, the presently disclosed technology contemplates having sensitive data controllers provide modelers with aggregated feature data about groups (or cohorts) of individuals. The aggregated feature data (referred to herein as cohort feature data) describes features about a group of individuals, but does not describe any specific individual. In this way, the data provided to a modeler maintains individual privacy, while still providing data that is useful to a modeler for, for example, modeling advertisement attribution. For example, assume a sensitive data controller knows that Users A, B, and C saw Advertisement A. Using the presently disclosed technology, the sensitive data controller can group Users A, B, and C into a cohort with other users, Users D and E, who were not presented with Advertisement A. The sensitive data controller can generate cohort feature data about the cohort (e.g., group) of individuals. For example, the cohort feature data may indicate that 60% of users in the cohort saw Advertisement A. The cohort feature data can be provided to a modeler along with cohort membership information indicating the individual users that are in the cohort (e.g., indicating that Users A, B, C, D, and E are in the cohort). In this way, the specific advertisement viewing histories of Users A, B, C, D, and E are not disclosed to the modeler, but the modeler is provided with useful information about a plurality of individuals that the modeler can use to make probabilistic determinations about those individuals.

The modeler can aggregate cohort feature data received from various sensitive data controllers to create a final modeling feature set. The final modeling feature set can be used to model a desired behavior, draw conclusions, and/or create reports. Utilizing the presently disclosed technology, the modeler is never provided with access to any single user's sensitive data. Rather, data is provided for groups (or cohorts) of users so that the modeler can still draw probabilistic conclusions about individual users without specifically knowing sensitive data about any individual user. In certain embodiments, sensitive data controllers can generate individual feature data independently of one another (e.g., without collaboration with any other sensitive data controllers). Furthermore, sensitive data controllers can also generate groupings of individuals (or cohorts) independently of one another and also in isolation from any other party (e.g., a modeler). Many variations are possible. More details relating to the disclosed technology are provided below.

FIG. 1 illustrates an example sensitive data modeling system 102, according to an embodiment of the present technology. As shown in the example of FIG. 1, the sensitive data modeling system 102 can include a sensitive data controller module 104 and a modeler module 106. In some instances, the example sensitive data controller module 104 can communicate with at least one data store 110. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the sensitive data modeling system 102 can be implemented in any suitable combinations.

In some embodiments, the sensitive data modeling system 102, the sensitive data controller module 104, and/or the modeler module 106 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the sensitive data modeling system 102, the sensitive data controller module 104, and/or the modeler module 106 can be, in part or in whole, implemented as software running on one or more computing devices or systems, such as on a server system or a client computing device. In some instances, the sensitive data modeling system 102, the sensitive data controller module 104, and/or the modeler module 106 can be, in part or in whole, implemented within or configured to operate in conjunction with or be integrated with a social networking system (or service), such as a social networking system 630 of FIG. 6. Likewise, in some instances, the sensitive data modeling system 102, the sensitive data controller module 104, and/or the modeler module 106 can be, in part or in whole, implemented within or configured to operate in conjunction with or be integrated with a client computing device, such as the user device 610 of FIG. 6. For example, the sensitive data modeling system 102, the sensitive data controller module 104, and/or the modeler module 106 can be implemented as or within a dedicated application (e.g., app), a program, or an applet running on a user computing device or client computing system. The application incorporating or implementing instructions for performing functionality of the sensitive data modeling system 102, the sensitive data controller module 104, and/or the modeler module 106 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

In various embodiments, the sensitive data controller module 104 can be configured to communicate and/or operate with the at least one data store 110. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some implementations, the data store 110 can store information to be utilized by the sensitive data controller module 104, such as sensitive user data, individual feature data, cohort feature data, and the like. Although not shown in FIG. 1, in certain embodiments, the modeler module 106 also can be associated with and communicate with a separate, dedicated datastore administered by a modeler.

The sensitive data controller module 104 can be configured to generate individual feature data for each individual of a plurality of individuals. The individual feature data may relate to any set of features that a modeler would like to model and draw conclusions on, as will be described in greater detail below. The sensitive data controller module 104 can also be configured to group individuals into one or more cohorts based on individual feature data, and generate cohort feature data for each cohort of the one or more cohorts. The sensitive data controller module 104 can provide cohort feature data for a cohort as well as cohort membership information to a modeler so that the modeler can run models and generate conclusions and/or reports based on the cohort feature data. More details regarding the sensitive data controller module 104 will be provided below with reference to FIG. 2.

The modeler module 106 can be configured to receive cohort feature data about a plurality of cohorts from a plurality of sensitive data controllers. The modeler module 106 can aggregate the information in the various sets of cohort feature data to generate a final modeling feature set. The modeler module 106 can utilize the final modeling feature set to model a desired behavior, draw conclusions, and/or create reports. More details regarding the modeler module 106 will be provided below with reference to FIG. 3.

Figure 2:
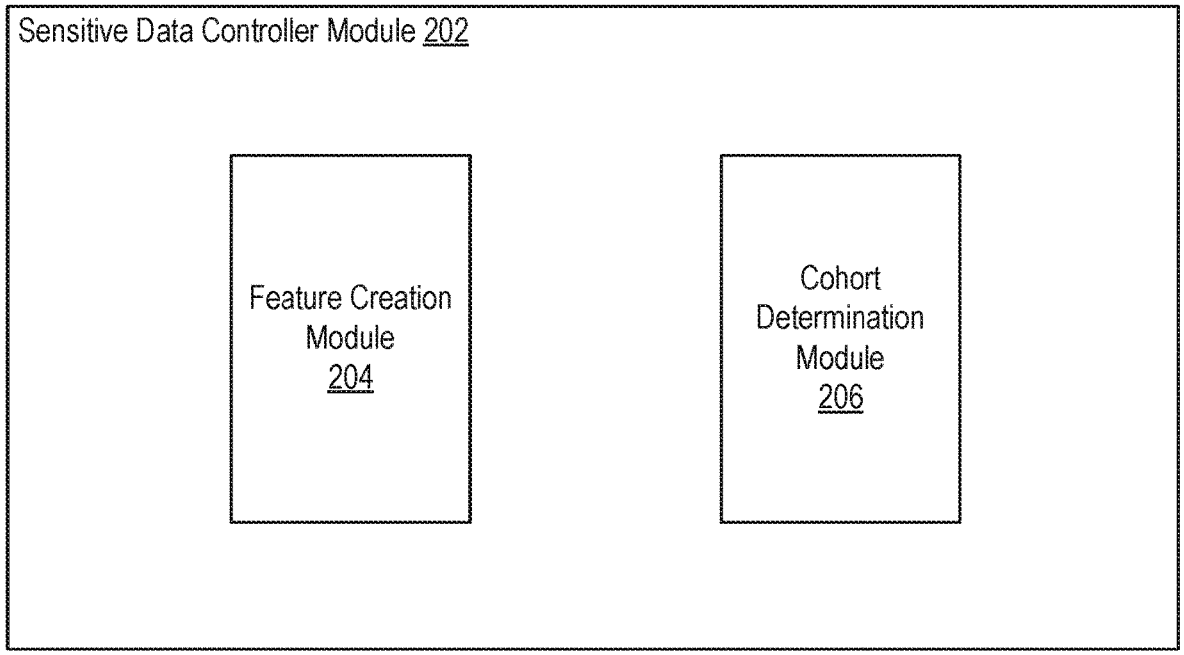
FIG. 2 illustrates a sensitive data controller module, according to an embodiment of the present technology.

FIG. 2 illustrates an example sensitive data controller module 202 according to an embodiment of the present technology. In some embodiments, the sensitive data controller module 104 of FIG. 1 can be implemented as the sensitive data controller module 202. As shown in the example of FIG. 2, the sensitive data controller module 202 can include a feature creation module 204 and a cohort determination module 206.

The feature creation module 204 can be configured to generate individual feature data pertaining to individuals based on data (e.g., sensitive user data) available to a sensitive data controller. The individual feature data may relate to any set of features that a modeler would like to model and draw conclusions on. For example, consider an example scenario in which Brand A would like to determine the efficacy of a particular advertisement advertising Product A. A sensitive data controller, such as a social networking system, may have access to certain information about the advertisement as it pertains to individual users. For example, the social networking system may have information indicating, for each individual user, whether or not the user was presented with the advertisement, how many times the user was presented with the advertisement, and the dates and times when the user was presented with the advertisement, to name some examples. The social networking system can generate individual feature data for each individual that is indicative of this information. Another sensitive data controller, such as an online retailer, may have access to other information about the advertisement as it pertains to individual users. This may be information that is not available to other parties, such as the social networking system. For example, the online retailer may have information indicating which users purchased Product A and when the users purchased Product A, to name some examples. As such, the online retailer can generate individual feature data for each individual that is indicative of this information. Each sensitive data controller may have access to a unique set of sensitive data that is not available to any other sensitive data controller. Although the example of a social networking system will be used in various examples discussed herein, it should be understood that the present technology can be applied to any addressable advertising.

It can be appreciated that the relevant individual feature data to be generated for each individual may differ in different instances depending on what the modeler has been tasked with analyzing. For example, if Brand A, rather than studying the efficacy of a particular advertisement, wanted to study the efficacy of video advertisements versus still-image advertisements, the relevant individual feature data may include which users were presented with video advertisements, which users were presented with image advertisements, which users were presented with neither, and which users were presented with both. Other examples of analyses that may be performed by a modeler can include which advertisements are most effective for different groups of people or different demographics, which advertisements are most effective in different geographic markets, what types of ads are more effective than other types of ads, and the like. Many variations are possible.

In certain embodiments, sensitive data controllers may generate individual feature data independently of one another. For example, a modeler may indicate to each sensitive data controller of a set of sensitive data controllers what the modeler would like to analyze and draw conclusions on. Each sensitive data controller may generate feature data that relates to the study being conducted by the modeler. For example, in an example scenario in which Brand A is looking to study whether color advertisements are more or less effective than black and white advertisements for a set of products, a first sensitive data controller (e.g., a social networking system) may generate individual feature data indicating which users were presented with color advertisements for the set of products, which users were presented with black and white advertisements for the set of products, which users were presented with neither, and which users were presented with both. A second sensitive data controller (e.g., a search engine), may independently generate similar individual feature data based on the information available to the second sensitive data controller (e.g., individual feature data indicative of which users were presented with color advertisements for the set of products, which users were presented with black and white advertisements for the set of products, which users were presented with neither, and which users were presented with both), while a third sensitive data controller (e.g., an online retailer), may independently generate a completely different, but still related, set of individual feature data, such as individual feature data indicating which individuals purchased products from the set of products, which products they purchased, and when.

The cohort determination module 206 can be configured to generate groupings of individuals, i.e., cohorts, based on individual feature data. The cohort determination module 206 can also be configured to generate, for each cohort, cohort feature data based on individual feature data for each individual included in the cohort. Cohort feature data for a cohort may be determined based on an aggregation or combination of individual feature data for individuals included in the cohort. As described above, rather than providing a modeler with individual feature data pertaining to individuals, the presently disclosed technology contemplates that a sensitive data controller can provide a modeler with cohort feature data pertaining to a group of individuals. By providing a modeler with cohort feature data for a group of individuals, sensitive information for individuals can be protected while still providing the modeler with useful information. The cohort determination module 206 can be configured to generate cohorts in such a way that sensitive user information is protected. This may comprise generating cohorts that are diverse with respect to one or more features represented in individual feature data. For example, consider an example scenario in which a sensitive data controller has generated individual feature data indicating which users have seen a particular advertisement. A feature that is represented by the individual feature data is whether or not a user has seen the particular advertisement. In this scenario, it is not effective from a user privacy standpoint to generate a cohort in which 100% of users in the cohort have seen the advertisement, or in which none of the users have seen the advertisement, because cohort feature data associated with such a cohort would divulge sensitive information of an individual in the cohort. To protect sensitive information of an individual, the cohort determination module 206 can be configured to generate cohorts that have a selected (configurable) level of user privacy protection (or diversity) with respect to this feature by generating cohorts in which greater than 0% but less than 100% of individuals have seen the advertisement. The selected level of user privacy protection can be determined and varied by a sensitive data controller. In this regard, each sensitive data controller can generate cohorts in accordance with its own practices and policies for user privacy protection. For example, a first sensitive data controller may determine that its cohorts will be generated such that they do not allow for greater than 70% certainty about any individual feature for any individual, while another sensitive data controller may determine that its cohorts will be generated such that they do not allow for greater than 90% certainty about any individual feature for any individual.

The cohort determination module 206 can provide cohort feature data to a modeler. The cohort determination module 206 can also provide the modeler with cohort membership information identifying the individual users included in a cohort. As will be described in greater detail below, a modeler can receive, from a plurality of sensitive data controllers, cohort feature data and cohort membership information for a plurality of cohorts. The modeler can utilize the cohort feature data and cohort membership information to generate a model and draw various conclusions. In certain embodiments, different sensitive data controllers may generate cohorts independently of one another. As such, the membership of different cohorts can differ. As will be described in greater detail herein, a modeler can receive cohort feature data pertaining to different groupings of individuals, and can draw conclusions, for example, based on overlapping membership in various cohorts.

Figure 3:
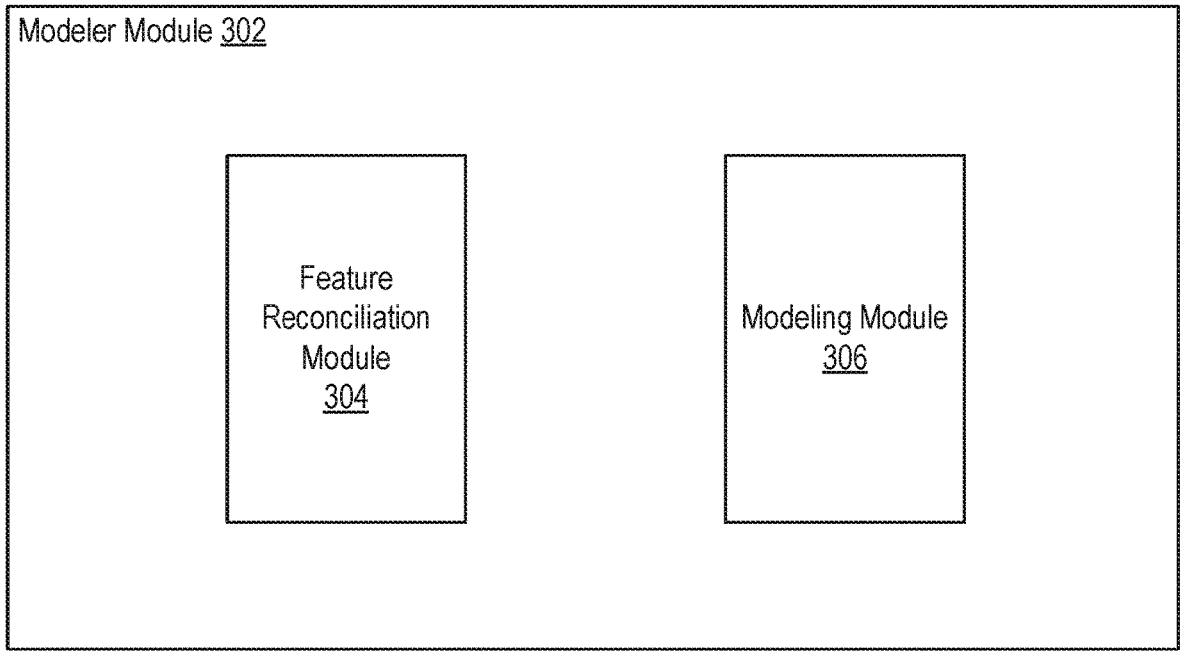
FIG. 3 illustrates a modeler module, according to an embodiment of the present technology.

FIG. 3 illustrates an example modeler module 302 according to an embodiment of the present technology. In some embodiments, the modeler module 106 of FIG. 1 can be implemented as the modeler module 302. As shown in the example of FIG. 3, the modeler module 302 can include a feature reconciliation module 304 and a modeling module 306.

The feature reconciliation module 304 can be configured to receive cohort feature data for a plurality of cohorts from a plurality of sensitive data controllers, and generate a final modeling feature set based on the cohort feature data for the plurality of cohorts. In an embodiment, the feature reconciliation module 304 can generate probabilistic determinations about individual users based on a plurality of sets of cohort feature data associated with a plurality of cohorts and received from a plurality of sensitive data controllers. These probabilistic determinations about individuals can be included in the final modeling feature set. For example, consider an example scenario in which a first sensitive data controller, a social networking system, has provided a cohort of 10 users, Users A-J, and has also provided cohort feature data indicating that 70% of the users in the cohort viewed an advertisement for Product A. Furthermore, a second sensitive data controller, an online retailer, has provided a cohort of 5 users, Users H, I, J, K, and L, and cohort feature data indicating that 40% of the users in this cohort viewed an advertisement for Product B on the online retailer's website The feature reconciliation module 304 can utilize the cohort feature data from the two sensitive data controllers to update individual profiles for each of the individuals in the two cohorts with probabilistic determinations about those individuals. For example, the feature reconciliation module 304 may update the individual profiles of Users A-G to indicate that there is a 70% likelihood that these individuals viewed an advertisement for Product A on the social networking system, update the individual profiles of Users K and L to indicate that there is a 40% likelihood that these individuals viewed an advertisement for Product A on the online retailer's website, and update the individual profiles Users H, I, and J to indicate that there is a 70% likelihood that these individuals viewed an advertisement for Product A on the social networking system and a 40% likelihood that each of these users viewed an advertisement for Product A on the online retailer's website.

In certain embodiments, different sensitive data controllers may use different identifiers for users. For example, a particular user may be "user123" on a social networking system, "accountXYZ" on an online retailer, and "user89uasdfu8" on a search engine. The feature reconciliation module 304 can be configured to utilize sync mappings to match user information from different sensitive data controllers. These sync mappings may be generated based on, for example, personally identifiable information (PII) (e.g., email address, phone number), cookie syncing, and/or device identifiers (e.g., phone IDs).

The modeling module 306 can be configured to generate a model and draw conclusions based on the final modeling feature set generated by the feature reconciliation module 304. In an embodiment, the modeling module 306 can utilize statistical analysis or other modeling techniques to draw conclusions, generate metrics, and/or generate reports pertaining to advertising purchases by an advertiser. The advertiser can be provided with the results of the analysis to inform future advertisement decisions. For example, if an advertiser spent $30M purchasing advertisements from three different platforms, the three different advertising platforms as sensitive data controllers can generate individual feature data pertaining to those advertisements, generate cohorts, and provide cohort feature data pertaining to those advertisements to the modeler (e.g., an entity that implements the modeler module 302). The feature reconciliation module 304 can aggregate the information contained in the cohort feature data received from the different sensitive data controllers, and the modeling module 306 can generate one or more models to determine the efficacy of those advertisements across the three advertising platforms. For example, the modeling module 306 may conclude that the advertiser spent $30M buying advertisements across the three advertising platforms, and increased sales by $40M as a result of the advertisements. Or, the modeling module 306 may conclude that the advertisements were more successful on a first advertising platform than a second advertising platform, such that the advertisement should be shown more on the first platform and less on the second platform. It should be understood that many of the examples provided herein are simplified examples to demonstrate how cohort feature data about a group of individuals can be used to make probabilistic determinations about individuals in a cohort and to draw conclusions about, for example, advertising attribution. Modelers may employ models of varying levels of sophistication and complexity utilizing the presently disclosed technology.

Figure 4:
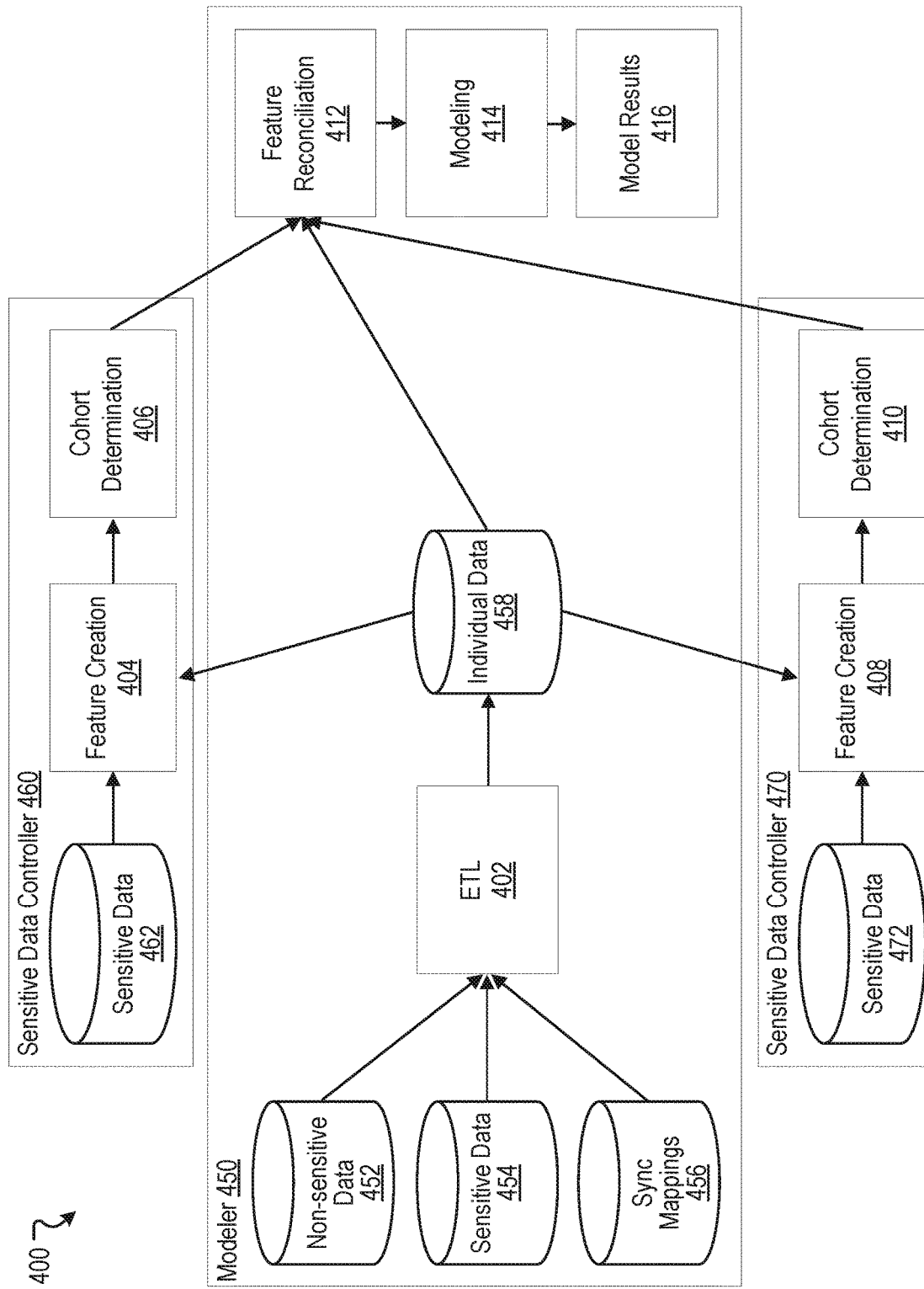
FIG. 4 illustrates an example functional diagram illustrating data flow between data controllers and a modeler, according to an embodiment of the present technology.

FIG. 4 illustrates an example functional block diagram 400 that illustrates functionality of the sensitive data modeling system 102, and communications between various parties, according to an embodiment of the present technology. In the example functional block diagram 400, two sensitive data controllers 460 and 470 are providing information to a modeler 450. Each sensitive data controller 460, 470 has access to its own set of sensitive data 462, 472, respectively. The modeler 450 has access to a set of non-sensitive data 452. This can include data that does not reveal private information about any individual, such as stock prices, weather in different geographic areas, and the like. The modeler 450 also has access to a set of sensitive data 454 that may be available to the modeler 450, but may not be available to the sensitive data controllers 460, 470. This may be information, for example, that the modeler 450 has obtained from other sensitive data controllers. The modeler 450 also has access to a set of sync mappings 456 that allow the modeler 450 to match user identifiers from different sensitive data controllers so that the modeler 450 can determine when different sensitive data controllers are referencing the same individual. At block 402, the modeler 450 combines information from these information sources using an "ETL" (extract, transform, load) process to generate a set of individual profiles 458 for a plurality of users.

At blocks 404 and 408, each sensitive data controller 460, 470, respectively, independently generates individual feature data for individual users (e.g., using feature creation module 204). It can be seen that there are arrows from the individual data profiles 458 to the feature creation blocks 404, 408. In certain embodiments, individual feature data creation may be informed, at least in part, based on parameters defined by the modeler 450. For example, the modeler 450 may have access to information indicating that a particular user purchased Product A on a particular date, and this information may be reflected in an individual profile for the user. In this example, the modeler 450, seeking to determine whether an advertisement was at least partially responsible for the purchase, may specify to the sensitive data controllers 460, 470 that all advertisement information for the particular user taking place after the particular date should not be included in the individual feature data for that user since those advertisements would not have affected the user's purchase decision. Although various examples disclosed herein make reference to tracking purchase information, and attributions for purchases, it should be understood that the present technology is not so limited. The present technology can be applied to all outcomes that an advertiser may wish to track, including, for example, lead generation and/or website visits. Many variations are possible.

At blocks 406 and 410, each sensitive data controller 460, 470 independently generates cohorts and cohort feature data based on individual feature data (e.g., using cohort determination module 206). Each sensitive data controller 460, 470 provides cohort feature data and cohort membership information to the modeler 450. As discussed, the cohort feature data can be associated with or reflect a selected level of user privacy protection as determined in accordance with the practices and policies regarding user privacy protection of each sensitive data controller 460, 470. At block 412, the modeler 450 reconciles (e.g., aggregates or combines) the information contained in the cohort feature data, the cohort membership information, and the individual profile data 458 to generate a final modeling feature set based on probabilistic determinations. At block 414, the modeler 450 creates one or more models based on the final modeling feature set, and at block 416, the modeler 450 generates, for example, one or more reports which report on conclusions from the one or more models. The one or more reports may be provided, for example, to an advertiser, to inform future advertising decisions.

Figure 5:
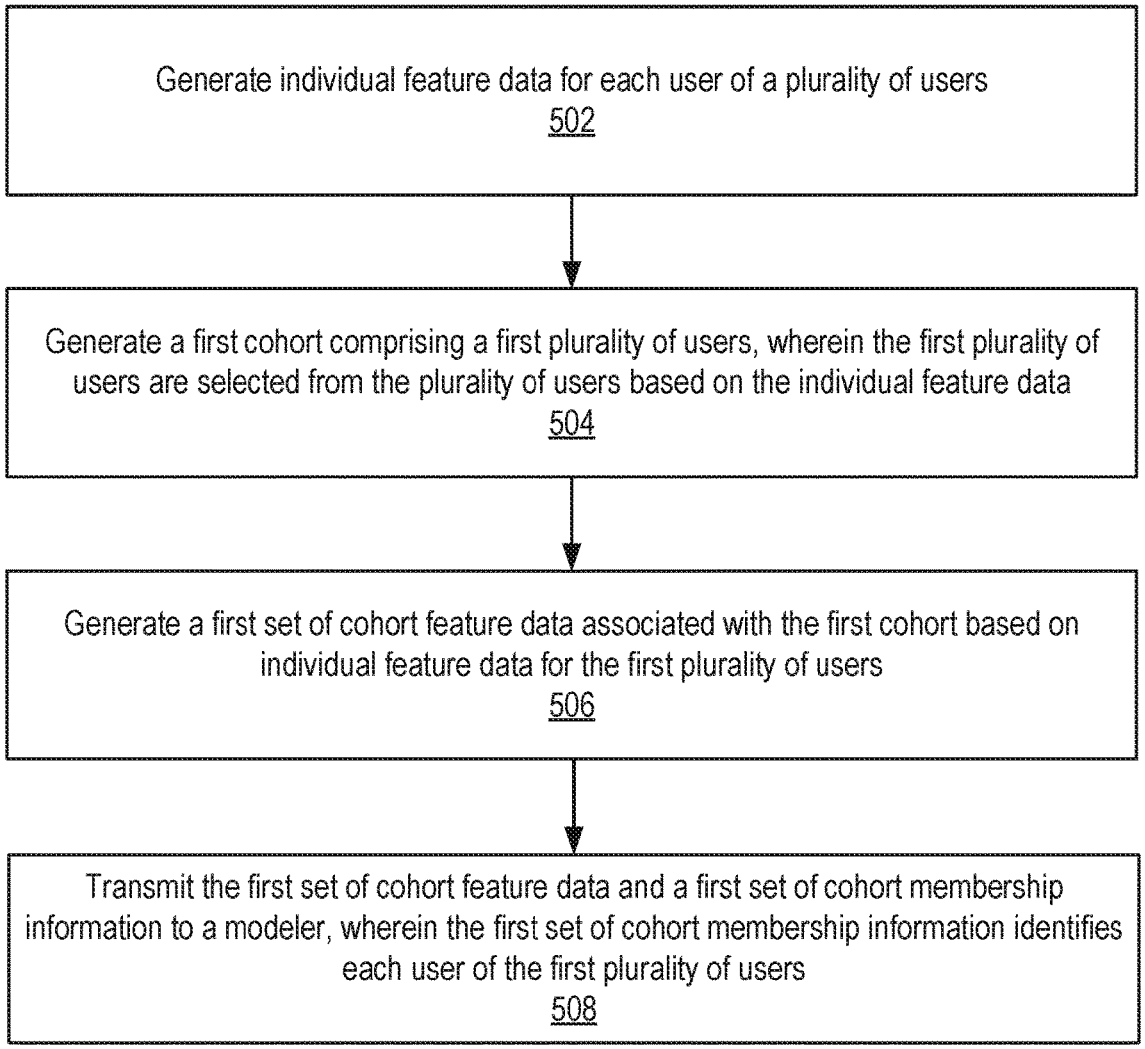
FIG. 5 illustrates an example method, according to an embodiment of the present technology.

FIG. 5 illustrates an example method 500, according to an embodiment of the present technology. It should be appreciated that there can be additional, fewer, or alternative steps performed in similar or alternative orders, or in parallel, within the scope of the various embodiments discussed herein unless otherwise stated.

At block 502, the example method 500 can generate individual feature data for each user of a plurality of users. At block 504, the example method 500 can generate a first cohort comprising a first plurality of users, wherein the first plurality of users are selected from the plurality of users based on the individual feature data. At block 506, the example method 500 can generate a first set of a cohort feature data associated with the first cohort based on individual feature data for the plurality of users. At block 508, the example method 500 can transmit the first set of cohort feature data and a first set of cohort membership information to a modeler, wherein the first set of cohort membership information identifies each user of the first plurality of users.

It is contemplated that there can be many other uses, applications, and/or variations associated with the various embodiments of the present technology. For example, in some cases, users can choose whether or not to opt-in to utilize the disclosed technology. The disclosed technology can also ensure that various privacy settings and preferences are maintained and can prevent private information from being divulged. In another example, various embodiments of the present technology can learn, improve, and/or be refined over time.

Social Networking System—Example Implementation

Figure 6:
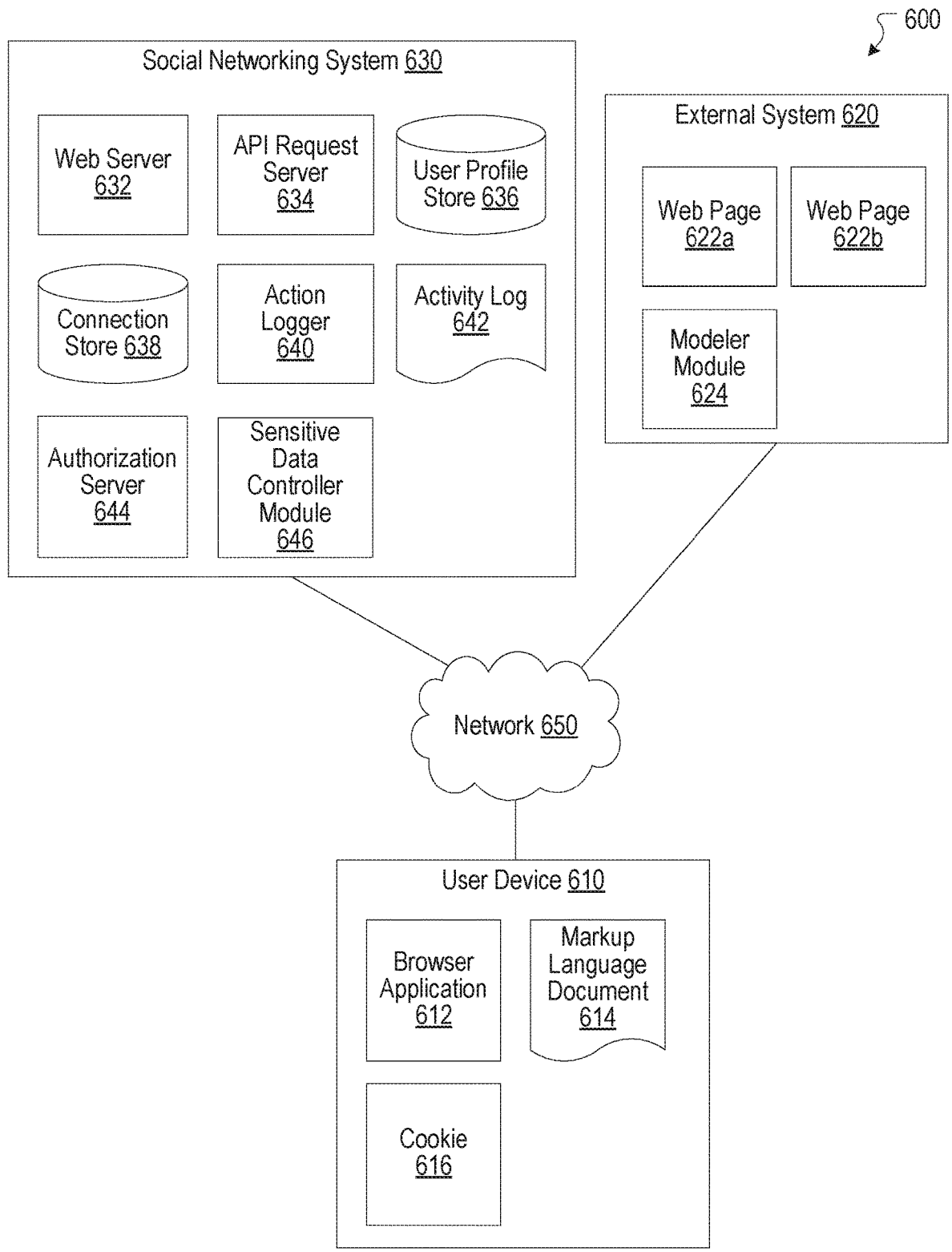
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, according to an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a sensitive data controller module 646. The sensitive data controller module 646 can, for example, be implemented as the sensitive data controller module 104, as discussed in more detail herein. In some embodiments, one or more functionalities of the sensitive data controller module 646 can be implemented in the user device 610. In some embodiments, the external system 620 can include a modeler module 624. The modeler module 624 can, for example, by implemented as the modeler module 106, as discussed in more detail herein. Although the modeler module 624 is shown as part of the same external system 620 as one or more web pages 622a, 622b, it should be understood that the modeler module 624 may be associated with a first external system, and the web pages 622a, 622b may be associated with a second external system. As discussed previously, it should be appreciated that there can be many variations or other possibilities.

Hardware Implementation

Figure 7:
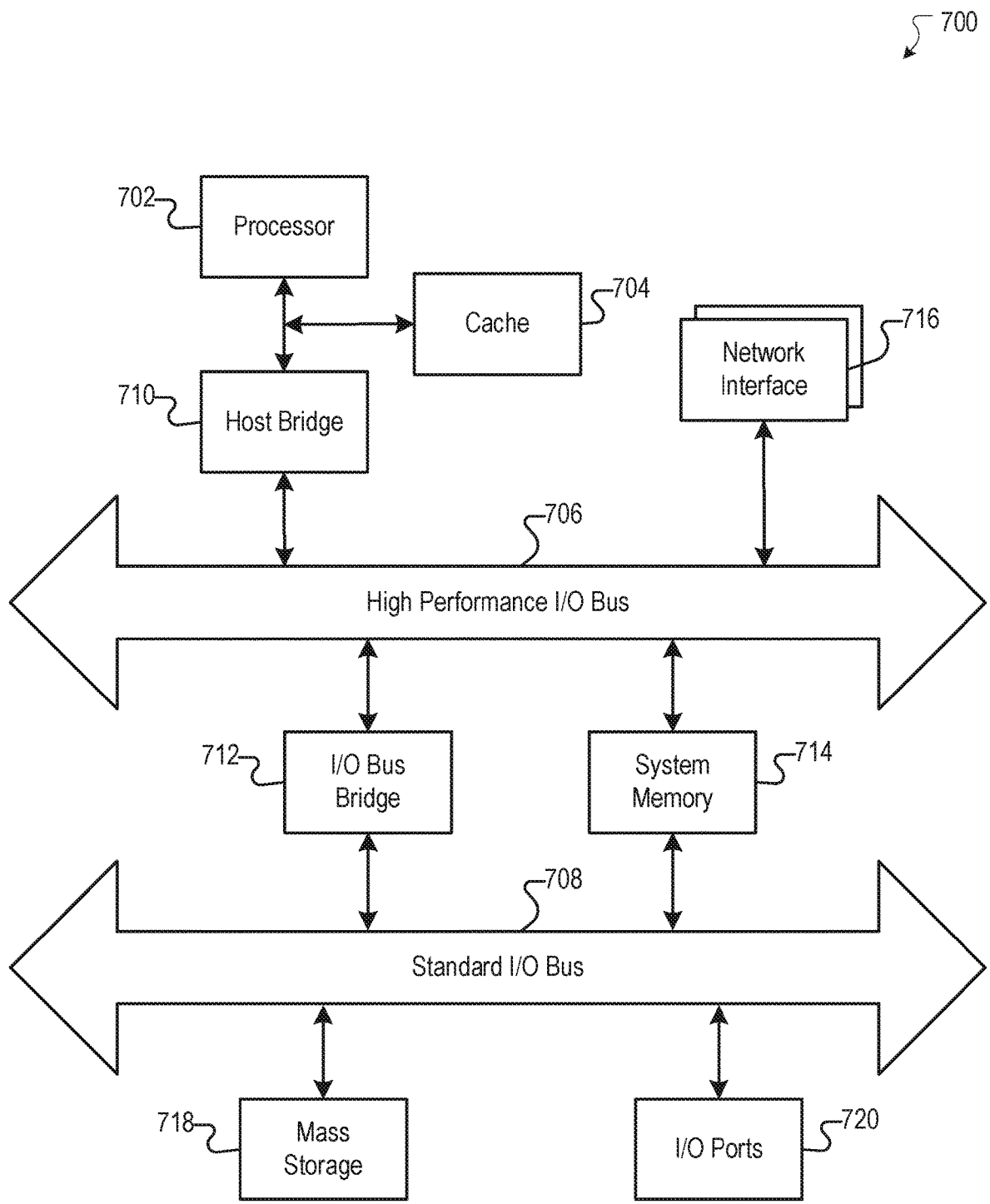
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs));

other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
generating, by a computing system, individual feature data for each user of a plurality of users;
generating, by the computing system, a first cohort comprising a first plurality of users, wherein the first plurality of users are selected from the plurality of users based on the individual feature data;
generating, by the computing system, a first set of cohort feature data associated with the first cohort based on individual feature data for the first plurality of users, the first set of cohort feature data associated with a selected level of user privacy protection, the selected level of user privacy protection determined by a sensitive data controller and associated with selective generation of the first cohort such that a certainty about a feature in relation to the first plurality of users does not exceed a configurable threshold value, wherein the sensitive data controller is a networking system; and
transmitting, by the computing system, the first set of cohort feature data and a first set of cohort membership information to a modeler, wherein the first set of cohort membership information identifies each user of the plurality of users.

2. The computer-implemented method of claim 1, wherein the first set of cohort feature data is one of a plurality of sets of cohort feature data transmitted to the modeler.

3. The computer-implemented method of claim 2, wherein the plurality of sets of cohort feature data are transmitted to the modeler by a plurality of sensitive data controllers.

4. The computer-implemented method of claim 3, wherein each set of cohort feature data of the plurality of sets of cohort feature data is associated with a respective cohort of a plurality of cohorts, and each sensitive data controller generates one or more cohorts of the plurality of cohorts independently of the other sensitive data controllers.

5. The computer-implemented method of claim 4, wherein each sensitive data controller of the plurality of sensitive data controllers has access to a unique set of sensitive data pertaining to one or more users.

6. The computer-implemented method of claim 3, wherein the plurality of sensitive data controllers include the networking system and an online retailer.

7. The computer-implemented method of claim 1, wherein the first plurality of users are selected from the plurality of users such that the first cohort is diverse with respect to at least one feature represented in the individual feature data.

8. The computer-implemented method of claim 1, wherein the first set of cohort feature data allows the modeler to make probabilistic determinations about each user of the first plurality of users.

9. The computer-implemented method of claim 1, wherein the individual feature data pertains to one or more advertisements.

10. The computer-implemented method of claim 9, wherein the individual feature data for each user indicates whether the user was presented with a particular advertisement.

11. The computer-implemented method of claim 1, wherein
the configurable threshold value is determined based on (i) desired provision of useful information and (ii) protection of sensitive information of individual users.

12. A system comprising:
at least one processor; and
a memory storing instructions that, when executed by the at least one processor, cause the system to perform a method comprising:
generating individual feature data for each user of a plurality of users;
generating a first cohort comprising a first plurality of users, wherein the first plurality of users are selected from the plurality of users based on the individual feature data;
generating a first set of cohort feature data associated with the first cohort based on individual feature data for the first plurality of users, the first set of cohort feature data associated with a selected level of user privacy protection, the selected level of user privacy protection determined by a sensitive data controller and associated with selective generation of the first cohort such that a certainty about a feature in relation to the first plurality of users does not exceed a configurable threshold value, wherein the sensitive data controller is a networking system; and transmitting the first set of cohort feature data and a first set of cohort membership information to a modeler, wherein the first set of cohort membership information identifies each user of the plurality of users.

13. The system of claim 12, wherein the first set of cohort feature data is one of a plurality of sets of cohort feature data transmitted to the modeler.

14. The system of claim 13, wherein the plurality of sets of cohort feature data are transmitted to the modeler by a plurality of sensitive data controllers.

15. The system of claim 14, wherein each set of cohort feature data of the plurality of sets of cohort feature data is associated with a respective cohort of a plurality of cohorts, and each sensitive data controller generates one or more cohorts of the plurality of cohorts independently of the other sensitive data controllers.

16. The system of claim 15, wherein each sensitive data controller of the plurality of sensitive data controllers has access to a unique set of sensitive data pertaining to one or more users.

17. A non-transitory computer-readable storage medium including instructions that, when executed by at least one processor of a computing system, cause the computing system to perform a method comprising:

generating individual feature data for each user of a plurality of users;

generating a first cohort comprising a first plurality of users, wherein the first plurality of users are selected from the plurality of users based on the individual feature data;

generating a first set of cohort feature data associated with the first cohort based on individual feature data for the first plurality of users, the first set of cohort feature data associated with a selected level of user privacy protection, the selected level of user privacy protection determined by a sensitive data controller and associated with selective generation of the first cohort such that a certainty about a feature in relation to the first plurality of users does not exceed a configurable threshold value, wherein the sensitive data controller is a networking system; and transmitting the first set of cohort feature data and a first set of cohort membership information to a modeler, wherein the first set of cohort membership information identifies each user of the plurality of users.

18. The non-transitory computer-readable storage medium of claim 17, wherein the first set of cohort feature data is one of a plurality of sets of cohort feature data transmitted to the modeler.

19. The non-transitory computer-readable storage medium of claim 18, wherein the plurality of sets of cohort feature data are transmitted to the modeler by a plurality of sensitive data controllers.

20. The non-transitory computer-readable storage medium of claim 19, wherein each set of cohort feature data of the plurality of sets of cohort feature data is associated with a respective cohort of a plurality of cohorts, and each sensitive data controller generates one or more cohorts of the plurality of cohorts independently of the other sensitive data controllers.

* * * * *